United States Patent [19]

Yoshikawa

[11] Patent Number: 4,718,068
[45] Date of Patent: Jan. 5, 1988

[54] STABILIZED LASER DEVICE OF OPTICAL INFORMATION RECORDING/REPRODUCTION APPARATUS

[75] Inventor: Shozi Yoshikawa, Tokyo, Japan

[73] Assignee: Olympus Optical Co., Ltd., Tokyo, Japan

[21] Appl. No.: 814,616

[22] Filed: Dec. 30, 1985

[30] Foreign Application Priority Data

Jan. 17, 1985 [JP] Japan .................. 60-6122

[51] Int. Cl.$^4$ .............................. H01S 3/13
[52] U.S. Cl. ...................... 372/31; 372/29; 372/38; 369/44
[58] Field of Search .............. 372/24, 29, 31, 38, 372/26; 369/44, 46

[56] References Cited

U.S. PATENT DOCUMENTS

| | | | |
|---|---|---|---|
| 3,898,583 | 8/1975 | Shuey | 372/38 X |
| 4,525,822 | 6/1985 | Nishimura | 369/44 |
| 4,577,320 | 3/1986 | Yoshikawa et al. | 372/29 |
| 4,580,044 | 4/1986 | Hongo et al. | 372/31 X |

FOREIGN PATENT DOCUMENTS

| | | |
|---|---|---|
| 3404441 | 2/1984 | Fed. Rep. of Germany . |
| 3541002 | 11/1985 | Fed. Rep. of Germany . |
| 58-158051 | 3/1982 | Japan . |

Primary Examiner—Eugene R. Laroche
Assistant Examiner—Seung Ham
Attorney, Agent, or Firm—Frishauf, Holtz, Goodman & Woodward

[57] ABSTRACT

In a stabilized laser device of an optical recording/reproduction apparatus, in the reproduction mode, a laser beam of reproduction level is radiated on an optical disk, and data is read from the disk in the form of the light reflected from the disk. In the recording mode, a laser beam of the recording level (several times higher than the reproduction level) is radiated on the disk to form pits in the disk surface. The device has a semiconductor laser, a reference voltage generation source for generating reference values of the reproduction and recording levels, and a photodiode for photoelectrically converting laser light from the semiconductor laser so as to generate a detection signal a source of drive signals is provided for generating a first drive signal corresponding to the difference between the reference value of the recording level and the detection signal from the photodiode, and a second drive signal corresponding to the difference between the sum of reference values of the recording and reproduction levels and the detection signal from the photodiode. A switch supplies, in the reproduction mode, the first drive signal to the semiconductor laser and, in the recording mode, supplies one of the first drive signal and the sum of first and second drive signals in accordance with recording data.

10 Claims, 17 Drawing Figures

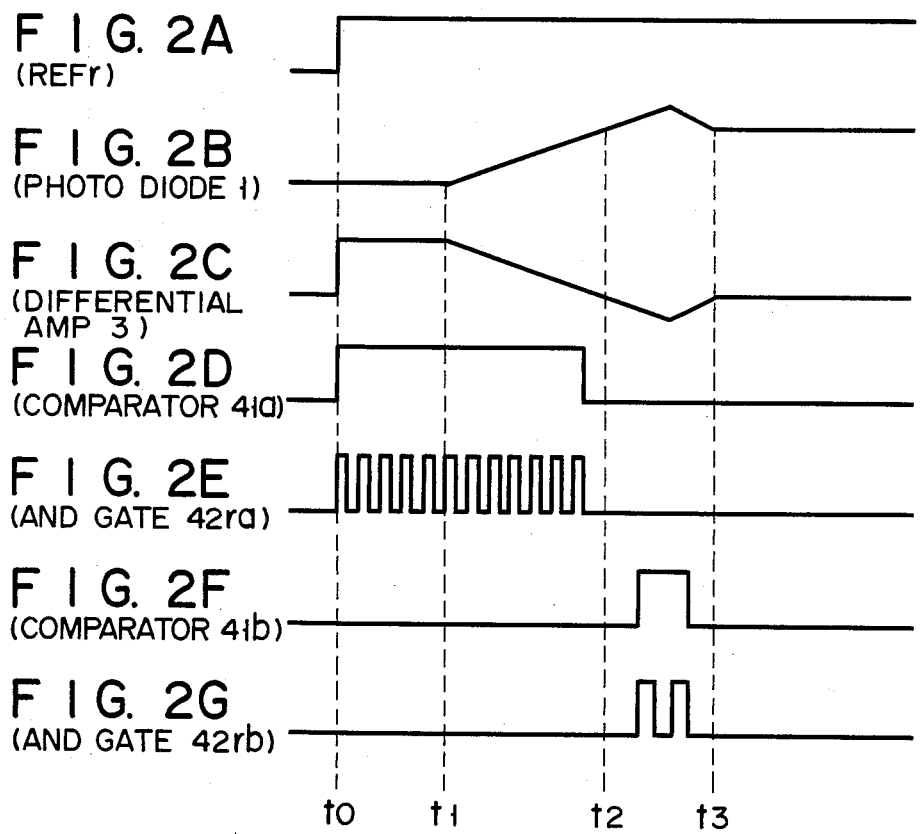

(GATE W)

(PHOTO DIODE 1)

(DIFFERENTIAL AMP 3)

(AND GATE 42 wa)

(AND GATE 42 wb)

STABILIZED LASER DEVICE OF OPTICAL INFORMATION RECORDING/REPRODUCTION APPARATUS

BACKGROUND OF THE INVENTION

The present invention relates to a laser device used in an optical information recording/reproduction apparatus and, more particularly, to a stabilized laser device in which output light is automatically controlled and stabilized at a desired level.

An optical information recording/reproduction apparatus has two operation modes (i.e., recording and reproduction modes). To read data from a recording medium (e.g., an optical disk), the apparatus is set in the reproduction mode. To write data on an optical disk is supplied, the apparatus is first set in the reproduction mode. The apparatus radiates a laser beam of a predetermined intensity (hereinafter called reproduction level) to read the address of the track, obtained in accordance with the reflected light therefrom. A head is then moved to a track corresponding to a write address. Thereafter, the apparatus is switched to the recording mode, and data is written at the address. For example, "1" data is written such that a laser beam of great intensity (hereinafter called recording level, normally several times higher than the reproduction level) is radiated on the disk to form pits in the disk surface. Since "0" data is written so as not to form pits on the disk surface, the laster output is switched to a low output (reproduction level). For this reason, output beam of a laser device used in the optical information recording/reproduction apparatus must have two different output levels.

In general, semiconductor laser output varies widely in accordance with environmental factors (e.g., ambient temperature). The semiconductor laser output also varies widely in accordance with self-degradation. For this reason, a device for stabilizing laser output and improving reliability is necessary for a semiconductor laser apparatus. A conventional semiconductor laser stabilized device used in an optical information recording/reproduction apparatus has been proposed in Japanese Patent Disclosure No. 58-158051. In this device, feedback control is performed by obtaining the difference between a detector signal from a photosensor and a reference signal in the reproduction mode, while open-loop control is performed in the recording mode. In the reproduction mode, a laser drive current is sampled and held and in the recording mode, the sum of recording data and the hold signal is used as a laser drive current. However, the conventional apparatus cannot cope with wide variations in ambient temperature in the recording mode.

SUMMARY OF THE INVENTION

It is an object of the present invention to provide a stabilized laser device which can provide stabilized laser light output both in the recording the reproduction modes in an optical information recording/reproduction apparatus.

It order to achieve the above object of the present invention, there is provided a stabilized laser device of an optical information recording/reproduction apparatus, comprising a stabilized laser device of an optical information recording/reproduction apparatus, comprising laser means, setting means for setting first and second reference values, photodetecting means for photoelectrically converting laser light emitted from the laser means and for generating a detection signal, drive signal generating means and for generating a first drive signal corresponding to a difference between the first reference value and the detection signal from the photodetecting means, and a second drive signal corresponding to a difference between the detection signal from the photodetecting means and a sum of the first and second reference values, and switching means for supplying, in a reproduction mode, the first drive signal to the laser means and modulating, in a recording mode, the second drive signal in accordance with recording data and supplying a modulated signal to said laser means.

BRIEF DESCRIPTION OF THE DRAWINGS

FIGS. 2A to 2G are timing charts showing the operation of the device of the first embodiment in the reproduction mode;

DETAILED DESCRIPTION OF THE PREFERRED EMBODIMENTS

Figure 1:
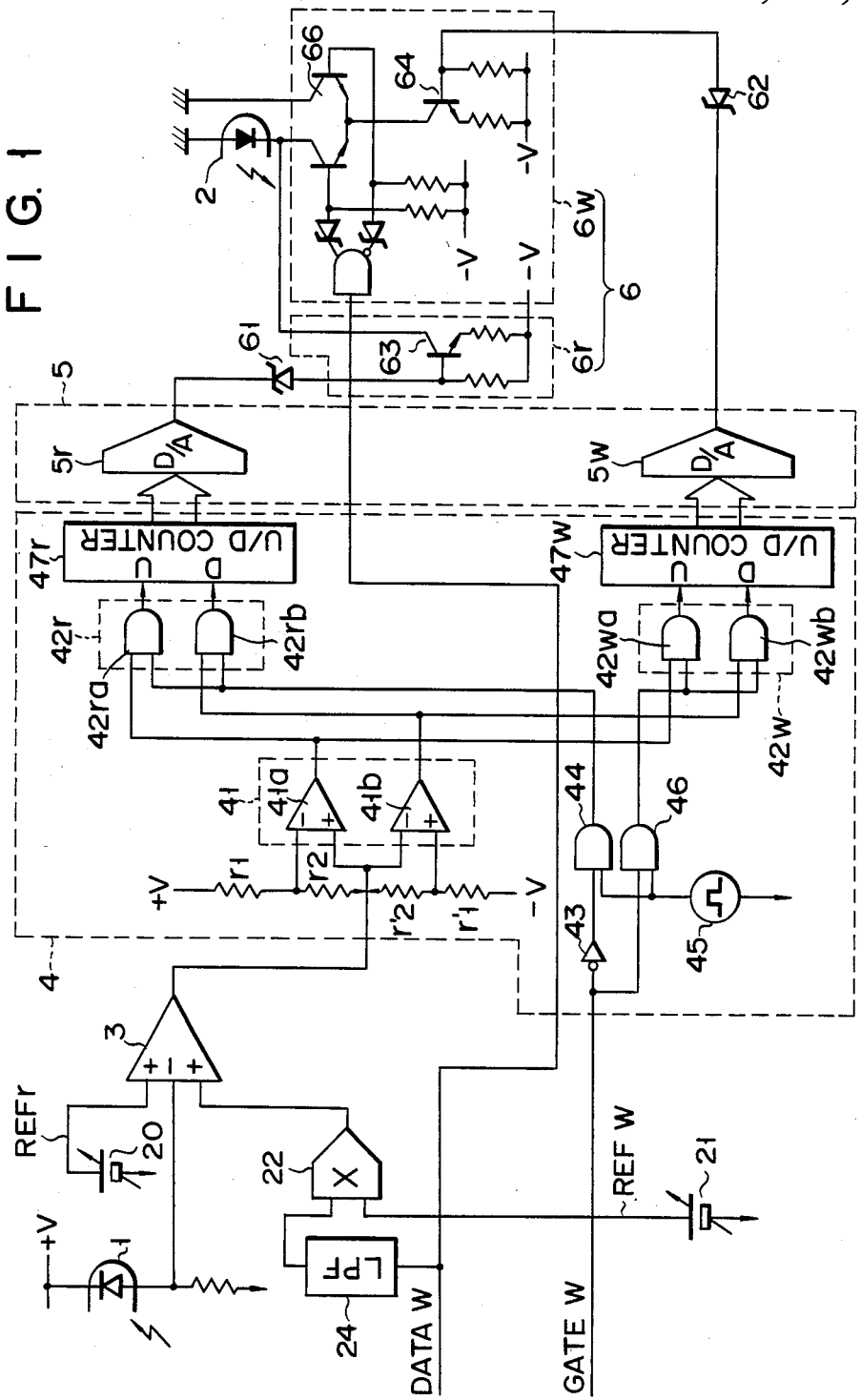
FIG. 1 is a circuit diagram of a stabilized laser device according to a first embodiment of the present invention.

A stabilized laser device according to an embodiment of the present invention will be described with reference to the accompanying drawings. FIG. 1 is a circuit diagram of the embodiment. This device is used in an optical information recording/reproduction apparatus using an optical disk. In this embodiment, the device has two control systems for recording the reproduction levels, as indicated by suffixes w and r, respectively, in FIG. 1.

The device of this embodiment has, generally, semiconductor laser (e.g. laser diode) 2, photodiode (e.g., PIN diode) 1, differential amplifier 3, drive signal generator 4, D/A converter 5, and driver 6. Generator 4, converter 5, and driver 6 have different control systems for recording and reproduction modes.

Photodiode 1 is normally formed integrally with laser 2. Photodiode 1 photoelectrically converts light emerging from the rear surface of laser 2 and produces a voltage signal. Light emerging from the front surface of laser 2 is radiated on an optical disk and used fror recording and reproduction. Since the intensity of light emerging from the front and rear surfaces of laser 2 is expected to be proportional, output light emerging from the rear surface can be assumed to be equivalent to output light from the front surface. However, when precision is of more importance, a half mirror or the like can be inserted in the light path of the front surface of laser 2, so that part of the light for recording/reproduction is incident on photodiode 1.

Differential amplifier 3 has one inverting input terminal and two non-inverting input terminals. Reproduction reference voltage REFr from variable power source 20, which is preset in the manufacturing stage in the factory, is applied to the first non-inverting input terminal of differential amplifier 3. Recording reference voltage REFw from variable power source 21 is supplied to the second non-inverting terminal of differential amplifier 3 through multiplier 22. Recording data (binary data) DATAw is supplied to multiplier 22 through low-pass filter 24. Therefore, only when recording data DATAw is supplied to multiplier 22 in the recording mode is recording reference voltage REFw applied to amplifier 3.

Figure 4:
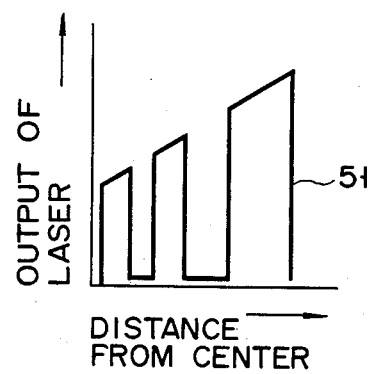
FIG. 4 is a graph showing laser output characteristics when laser output corresponding to a track position is corrected in the device of the first embodiment.

Since the optical disk is rotated at a constant angular speed, linear speed with respect to the laser beam increases and the laser beam intensity per unit area becomes weaker toward the outer track positions. The influence of this in the reproduction mode is negligible, but cannot be ignored in the recording mode. In order to obtain a constant laser beam intensity per unit area at any track position, the laser output must be increase toward outer track positions. For this purpose, a voltage from power source 21, which produces reference voltage REFw, is increased outward outer track positions to change the output from multiplier 22 as shown in FIG. 4.

Low-pass filter 24 is used to average recording data DATAw so that the influence of change in duty factors of data DATAw in the total system is eliminated. However, when frequency response of multiplier 22 is fast, low-pass filter 24 can be omitted.

Differential amplifier 3 generates an output signal corresponding to the different between the input at its inverting input terminal and the sum of inputs at the first and second non-inverting input terminals. The output from differential amplifier 3 is supplied to window comparator 41 in drive signal generator 4, which has comparators 41a and 41b. The output from differential amplifier 3 is supplied to the non-inverting input terminal of comparator 41a and to the inverting input terminal of comparator 41b. A positive reference voltage obtained by dividing positive voltage +V with resistors r1 and r2 is applied to the inverting input terminal of comparator 41a. A negative reference voltage obtained by dividing negative voltage −V with resistors r1' and r2' is applied to the non-inverting input terminal of comparator 41b.

The output signal from window comparator 41 is supplied to gate circuit 42r of the reproduction level system and gate circuit 42w of the recording level system. Each gate circuit has two AND gates. The output from comparator 41a, to which the positive reference voltage has been applied, is applied to the first input terminals of AND gates 42ra and 42wa. The output from comparator 41b, to which the negative reference voltage has been applied, is applied to the first input terminals of AND gates 42rb and 42wb. A clock pulse from clock pulse generator 45 is supplied to the second input terminals of AND gates 42ra and 42rb through AND gate 44. The clock pulse from clock pulse generator 45 is supplied to the second input terminals of AND gates 42wa and 42wb through AND gate 46. AND gate 44 receives recording gate signal GATEw through inverter 43. AND gate 46 receives gate signal GATEw.

The outputs from gate circuits 42r and 42w are supplied to up/down counters 47r and 47w of reproduction and recording systems, respectively. The outputs from AND gates 42ra and 42wa are supplied to up count terminals U of up/down counters 47r and 47w, and the outputs from AND gates 42rb and 42wb are supplied to down count terminals D of up/down counters 47r and 47w, respectively. The outputs from up/down counters 47r and 47w are supplied to D/A converters 5r and 5w of the reproduction and recording systems, respectively.

The output terminals of D/A converters 5r and 5w are connected to drivers 6r and 6w. The output signal from D/A converter 5r is supplied to drive transistor 63 of driver 6r through Zener diode 61. The collector current from drive transistor 63 is supplied to laser 2. The output signal from D/A converter 5w is supplied to driver transistor 64 of driver 6w through Zener diode 62. The collector current from drive transistor 64 is supplied to laser 2 through transistor pair 66. Transistor pair 66 is turned on and off in accordance with levels "1" and "0" of recording data DATAw. When pair 66 is turned on, the sum of the drive currents of drivers 6r and 6w is supplied to laser 2. When pair 66 is turned off, the drive current from driver 6r alone is supplied to laser 2.

The operation of the present invention will not be described. The operation in the reproduction mode will be described first with reference to the timing charts shown in FIGS. 2A to 2G. FIG. 2A shows the reproduction reference voltage REFr (at the non-inverting input terminal of differential amplifier 3); FIG. 2B, the output from photodiode 1 (at the inverting input terminal of differential amplifier 3); FIG. 2C, the output from differential amplifier 3; FIG. 2D, the output from comparator 41a; FIG. 2E, the output from AND gate 42ra (at up count terminal U of counter 47r); FIG. 2F, the output from comparator 41b; and FIG. 2G, the output from AND gate 42rb (at down count terminal D of counter 47r).

Assume that the reproduction mode is automatically set upon power on of the recording/reproduction apparatus. When the apparatus is energized at time t0, recording reference voltage REFr rises to a predetermined level, as shown in FIG. 2A.

Since recording data DATAw is at level "0" in the reproduction mode, transistor pair 66 is turned off, and the drive current from driver 6r alone is supplied to laser 2. Since the output from multiplier 22 is at level "0", reference voltage REFw is not applied to differential amplifier 3.

In addition, since recording gate signal GATEw is at level "0", AND gate 44 is turned on and AND gate 46 is turned off. The clock pulse from generator 45 is then supplied to gate circuit 42r through AND gate 44. Gate circuit 42w is disabled.

Immediately after the apparatus is energized, the count of counter 47r and the output from D/A converter 5r are small, the drive current from driver 6r is also small, and laser 2 is not illuminated. For this reason, the output signal from photodiode 1 is at low level, as shown in FIG. 2B.

Differential amplifier 3 generates a differential voltage representing the difference between reference voltage REFr and the output voltage from photodiode 1. The output signal from amplifier 3 is thus at high level, as shown in FIG. 2C. Since the differential voltage is larger than the positive reference voltage obtained by dividing positive voltage +V with resistors r1 and r2, a detection signal "1" is supplied from comparator 41a to AND gate 42ra, as shown in FIG. 2D. As a result, as shown in FIG. 2E, the clock pulse is supplied to up count terminal U of up/down counter 47r through AND gate 42ra. Since the output signal from differential amplifier 3 is larger than the negative voltage obtained by dividing negative voltage −V with resistors r1' and r2', a detection signal "0" is supplied from comparator 41b to AND gate 42rb, as shown in FIG. 2F. As a result, as shown in FIG. 2G, no clock pulse is generated through AND gate 42rb.

When the count of counter 47r and the output from D/A converter 5r thus increase gradually, the drive current from driver 6r is also increased. When the drive current from driver 6r exceeds a predetermined threshold value, light is emitted from laser 2. An emission start time of laser 2 is indicated by t1 in FIGS. 2A to 2G.

Thereafter, the output signal from photodiode 1 increases, as shown in FIG. 2B, and the output from differential amplifier 3 decreases, as shown in FIG. 2C. It is assumed that the output signal from photodiode 1 becomes equal to reproduction reference voltage REFr at time t2. Due to the overshoot of the feedback control system, output light from laser 2 is further increased. Then, the output signal (FIG. 2B) from photodiode 1 is further increased, and the output differential voltage (FIG. 2C) from differential amplifier 3 is further decreased and becomes smaller than the negative reference voltage obtained by dividing negative voltage $-V$ with resistors r1' and r2'. Thus, the detection signal "1" is supplied from comparator 41b to AND gate 42rb, as shown in FIG. 2F. As a result, as shown in FIG. 2G, the clock pulse is supplied to down count terminal D of up/down counter 47r through AND gate 42rb. Thereby, since the count of counter 47r and the output from D/A converter 5r are gradually decreased, the drive current from driver 6r is also decreased. At time t3, the output signal from photodiode 1 becomes equal to reproduction reference voltage REFr, and the supply of clock pulses is stopped, thus making the drive current from driver 6r constant.

In the reproduction mode, output light from laser 2 is feedback-controlled so that the output voltage from photodiode 1 is equal to reference voltage REFr of the reproduction level system.

Figure 3A:
FIGS. 3A to 3E are timing charts showing the operation of the device of the first embodiment in the recording mode.
Figure 3B:
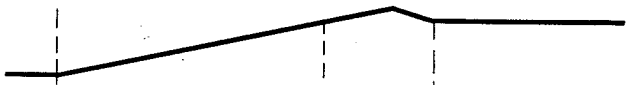
Figure 3C:
Figure 3D:

The operation in the recording mode will be described with reference to the timing charts shown in FIGS. 3A to 3E. FIG. 3A shows recording gate signal GATEw; FIG. 3B, the output from photodiode 1 (at the inverting input terminal of differential amplifier 3); FIG. 3C, the output from differential amplifier 3; FIG. 3D, the output from AND gate 42wa (at up count terminal U of counter 47w); and FIG. 3E, the output from AND gate 42wb (at down count terminal D of counter 47w).

When the recording mode is selected, the recording gate signal GATEw is set at level "1", as shown in FIG. 3A. Gate circuit 42r is thus disabled, and the clock pulse from generator 45 is supplied to gate circuit 42w through AND gate 46. The count of up/down counter 47w is increased or decreased in accordance with the output from differential amplifier 3. The content of the counter 47r is held. Multiplier 22 multiplies recording data DATAw, supplied through low-pass filter 24, with reference voltage REFw, and supplies the product to the non-inverting terminal of differential amplifier 3. When gate signal GATEw rises (at time t0), the output from amplifer 3 is at maximum, as shown in FIG. 3C. The clock pulse is generated through AND gate 42wa, as shown in FIG. 3D, and the count of up/down counter 47w and the drive current from driver 6w are increased. Thus, the light intensity of laser 2 increases, and the output voltage from photodiode 1 increases, as shown in FIG. 3B. When the output from differential amplifier 3 decreases, as shown in FIG. 3C and becomes equal to reference voltage REFw from comparator 41 (at time t1), the detection signal "1" from comparator 41 is stopped.

Figure 3E:
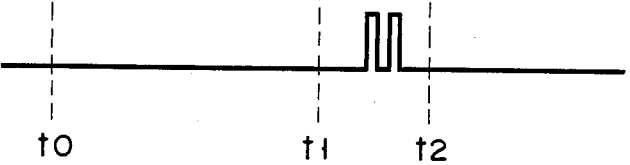

Due to the overshoot of the feedback control system, output light from laser 2 is further increased. Then, the output signal (FIG. 3B) from photodiode 1 further increases, and the output differential voltage from differential amplifier 3 further decreases, becoming smaller than the negative reference voltage obtained by dividing negative voltage $-V$ with resistors r1' and r2'. As shown in FIG. 3E, the clock pulse is then supplied to down count terminal D of up/down counter 47w through AND gate 42wb. Thereby, the count of counter 47w and the output from D/A converter 5r are decreased gradually, and the drive current from driver 6w is thus decreased. At time t2, the output signal from photodiode 1 becomes equal to reference voltage REFw, and the supply of clock pulses is stopped, thus making the drive current from driver 6w constant.

In short, in the recording mode, output light from laser 2 is also feedback-controlled so that the output voltage from photodiode 1 becomes equal to the sum of reference voltages REFw and REFr.

The operation for writing data onto the optical disk will be described. When recording data and its write address are supplied, the apparatus is first switched to the reproduction mode (i.e., recording gate signal GATEw is set at level "0"). Laser light of the reproduction level is radiated on the optical disk, and a head is shifted to a desired track position corresponding to the write address upon accessing of addresses on the disk. Next, the apparatus is switched to the recording mode (recording gate signal GATEw is set at level "1"). The sum of the drive currents from drivers 6w and 6r or the drive current from driver 6r alone is supplied to laser 2 in accordance with levels "1" or "0" of recording data DATAw. As a result, laser beams of high and low intensities are radiated to form or not form pits on the optical disk when recording data DATAw is "1" or "0".

Figure 5A:
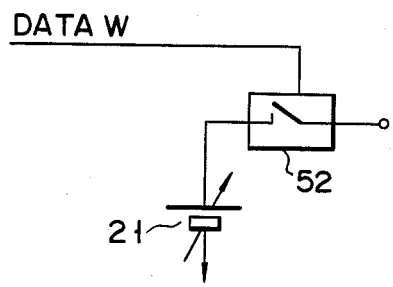
FIGS. 5A, 5B, and 5C show main portions of the second, third, and fourth embodiments of the present invention.
Figure 5B:
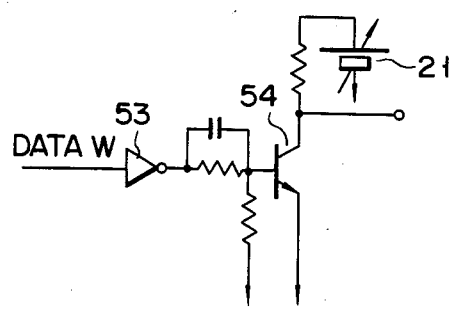
Figure 5C:
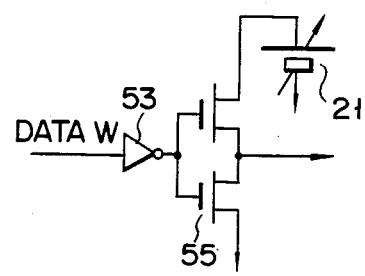

The cost of the multiplier 22 is high so that the multiplier 22 should be substituted by eqivalents. According to the second embodiment shown in FIG. 5A, analog switch 52 is used in place of multiplier 22. According to the third embodiment shown in FIG. 5B, a combination of inverter 53 and open collector transistor 54 is used in place of multiplier 22. According to the fourth embodiment shown in FIG. 5C, a combination of inverter 53 and CMOS gate 55 is used in place of multiplier 22. The second, third, and fourth embodiments have a merit of low cost.

According to the present invention, a stabilized laser device can be provided in which the laser output is stabilized both in the recording and reproduction modes.

The present invention is not limited to the above embodiment, and various changes and modifications may be made within the spirit and scope of the invention.

What is claimed is:

1. A stabilized laser device of an optical information recording/reproduction apparatus, comprising:
   laser means;
   setting means for setting first and second reference signals;
   photodetecting means for photoelectrically converting laser light emitted from said laser means and for generating a detection signal;

first signal generating means for generating, during a reproduction mode, a first signal corresponding to a difference between the first reference signal and the detection signal from said photodetecting means;

memory means for storing the first signal during a recording mode;

second signal generating means for generating, during a recording mode, a second signal corresponding to a difference between the detection signal from said photodetecting means and a sum of the first and second reference signals; and switching means for supplying to said laser means, in a reproduction mode, a first drive signal corresponding to the first signal generated from said first signal generating means and for supplying, in a recording mode, to said laser means selectively varied in accordance with recording data a second drive signal corresponding to the first signal stored in said means and the second signal generated from said second signal generating means.

2. A stabilized laser device according to claim 1, in which said setting means comprises multiplier means for multiplying said second reference signal and the recording data.

3. A stabilized laser device according to claim 2, in which said setting means comprises a low-pass filter having its input coupled to said recording data and its output coupled to said multiplier means.

4. A stabilized laser device according to claim 2, in which said multiplier means comprises an analog switch to the gate of which said recording data is supplied.

5. A stabilized laser device according to claim 2, in which said multiplier means comprises an open collector transistor to the base of which said recording data is supplied.

6. A stabilized laser device according to claim 2, in which said multiplier means comprises a CMOS gate to the gate of which said recording data is supplied.

7. A stabilized laser device according to claim 1, wherein said switching means, in the recording mode, supplies said second drive signal to the laser means to be always at least equal in magnitude to the first drive signal.

8. A stabilized laser device according to claim 1, wherein said switching means varies the second drive signal by selectively supplying, in response to the recording data, a component corresponding to the second signal generated by the second signal generating means.

9. A stabilized laser device according to claim 1, wherein said first signal generating means comprises:

a differential amplifier having one input terminal coupled to the photodetecting means to receive the detection signal and another input terminal coupled to the setting means to receive the first reference signal, a window comparator means for comparing the output from said diffrential amplifier with positive and negative threshold values to alternately generate first and second control signals when the positive and negative thresholds, respectively, are exceeded;

a first up/down counter means for, in the production mode, alternately counting up and down in accordance with the first and second control signals, respectively; and a first D/A converter means for generating said first signal in accordance with the output from said first up/down counter.

10. A stabilized laser device according to claim 9, wherein said second signal generating means comprises:

said differential amplifier;

a third input terminal in said differential amplifier coupled to the setting means to receive the second reference signal;

a second up/down counter means for, in the recording mode, alternately counting up and down in accordance with the first and second control signals, respectively; and a second D/A converter means for generating said second signal in acordance with the output from said second up/down counter.

* * * * *

UNITED STATES PATENT AND TRADEMARK OFFICE
CERTIFICATE OF CORRECTION

PATENT NO. : 4,718,068

DATED : Jan. 5, 1988

INVENTOR(S) : S. YOSHIKAWA

It is certified that error appears in the above-identified patent and that said Letters Patent is hereby corrected as shown below: On the Title Page:

In the Abstract, line 13, "...signal a source..." should read -- signal. A source -- .

Signed and Sealed this

Eleventh Day of October, 1988

Attest:

DONALD J. QUIGG

Attesting Officer

Commissioner of Patents and Trademarks